Jan. 17, 1967 — A. LIPPAY — 3,298,892
TRUSSED SANDWICH LAMINATES
Filed Dec. 6, 1963
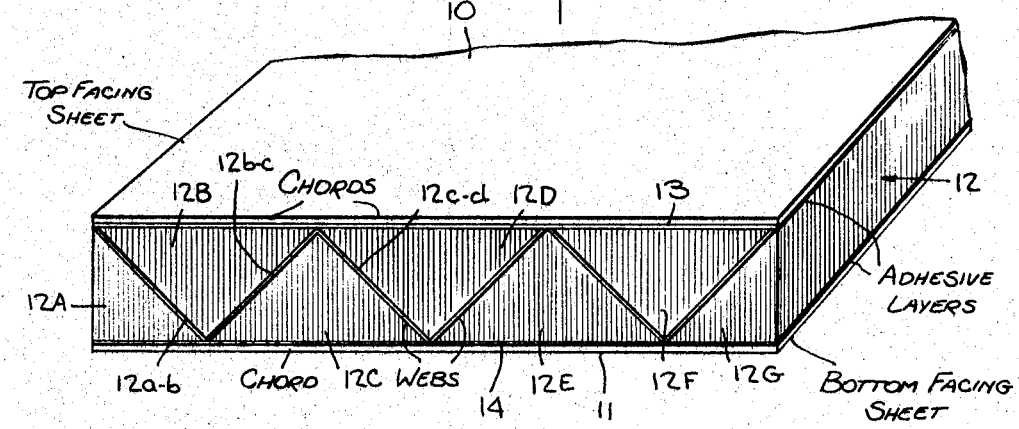
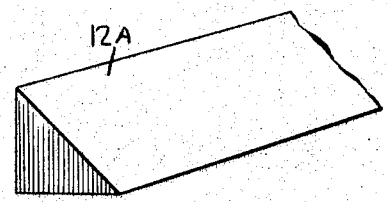
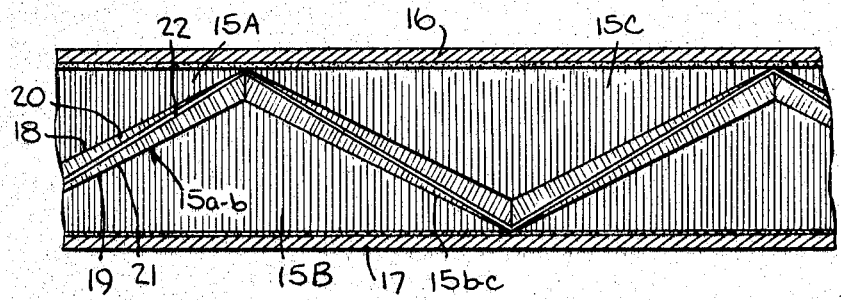
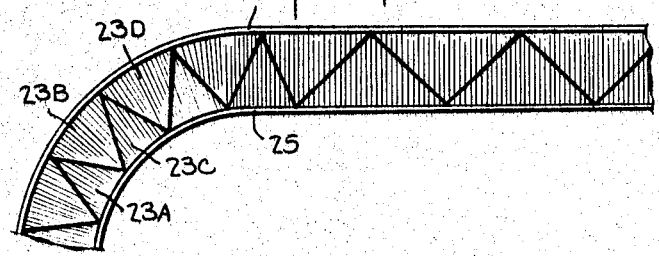
INVENTOR.
ALEXANDER LIPPAY
BY
ATTORNEY United States Patent Office 3,298,892
Patented Jan. 17, 1967

3,298,892
TRUSSED SANDWICH LAMINATES
Alexander Lippay, Croton-on-Hudson, N.Y., assignor to Balsa Ecuador Lumber Corporation, New York, N.Y., a corporation of New York
Filed Dec. 6, 1963, Ser. No. 328,606
10 Claims. (Cl. 161—38)

This invention relates generally to structural sandwich laminates in which a light-weight core is interposed between two facing sheets or skins, and more particularly to an improved sandwich laminate having a balsa wood core which incorporates truss components so as to constitute a composite structure having exceptional mechanical properties.

Structural sandwich laminates are fabricated by adhesively bonding thin facings or high tensile and compressive strength to light-weight core materials. The main function of the bonded core material in the sandwich is to stabilize and stiffen two thin facings so that the major part of the load is borne by the skins. The bonded core also converts the two skins into a unitary structure of great rigidity, so that they deform much less under load than they would unjoined. To serve these purposes, the core material must possess high compressive, shear and tensile strengths and a high modulus of rigidity in shear.

It is known that laminates of high strength-to-weight ratio can be realized by combining the superior properties of end-grain balsa wood cores with the required facing material. End-grain balsa of good quality has a uniformly high compressive strength as well as a high modulus of rigidity and elasticity. The resulting stabilization of the facings is such that with proper sandwich design, tensile failure tends to occur in the facings as opposed to a shear failure in the core during tests for ultimate bending strength.

Such balsa core sandwich laminates, in addition to their excellent mechanical properties and dimensional stability, also afford highly effective thermal insulation. Moreover, where the sandwich undergoes cyclic flexure, shock and vibration, it will be found that where a balsa core is used it is less subject to fatigue than other core materials.

Endgrain-balsa cored sandwich laminates have been widely used in transportation and handling equipment, such as for floors of railroad cars, shipping containers, cargo pallets, bulkheads, doors, reefer bodies, and in a wide variety of other applications. These laminates have also been employed for structural insulation in aircraft applications, housing and in boating. The load-bearing ability of end-grain balsa cored sandwich laminates is limited by the weakness of the orthotropic core material in the vertical shear direction, which runs parallel to the grain. This limitation has precluded the use of such laminates in situations involving unusually heavy loads.

Accordingly, it is the main object of this invention to provide a modified end-grain balsa cored sandwich laminate whose load-bearing ability is substantially augmented without any significant increase in the weight of the laminate.

More specifically, it is an object of the invention to provide a modified end-grain balsa cored sandwich laminate which incorporates a reinforcing truss which imparts longitudinal and transverse stiffness to the laminate and enhances both the vertical and horizontal shear strength of the core.

Also an object of the invention is to provide a modified laminate of the above-identified type, which may be formed into curved structures without bending of the balsa core.

Briefly stated, these objects are attained in a composite laminate and truss structure in which a core of interfitting, triangular or trapezoidal sections forming a unitary slab of end-grain balsa is interposed between two facing sheets and bonded thereto, the adjoining internal surfaces of said triangular sections being bonded together by an adhesive layer to form the angular bracing webs of a truss whose horizontal upper and lower chords are constituted by said facing sheets. In practice, the sections may be bonded together by a matting to form a reinforced web for the truss. In a more complex structural arrangement, the web elements of a major composite laminate-truss structure, may be formed by a minor composite laminate-truss structure, thereby dually reinforcing the main structure. Inasmuch as the core is a mosaic of interfitting or floating sections, it lends itself to molding or curvature without imposing binding stresses on the balsa. Thus, the core sections may be made to conform to shaped configurations which incorporate a truss arrangement.

For a better understanding of the invention, as well as other objects and further features thereof, reference is made to the following detailed description to be read in conjunction with the accompanying drawing, wherein:

FIGURE 1 is a perspective view of one preferred form of a composite truss-and-laminate structure in accordance with the invention;

FIGURE 2 shows in perspective a single triangular section of the core;

FIGURE 3 is a modified form of the composite-section shown in transverse section, the figure illustrating the grain orientation of the orthotropic material to accomplish more direct support of web and chord deflection; and FIGURE 4 is another preferred embodiment of the composite structure, shown in transverse section, the structure having a curved configuration.

The balsa core represents a major aspect of the invention, hence the nature of this material and its thermal and mechanical properties will be reviewed briefly. Balsa is the lightest of commercial woods, and is derived from a fast-growing tree found in Central and South America, which attains maturity within six to seven years. After being converted into lumber, it is kiln-dried. Once dried, it will not be subject to deterioration by decay, if used properly. One well-known, high-grade form of commercially available balsa is sold under the trademark "Belcobalsa," and the mechanical values set forth below are for various grades of this material.

Balsa has outstanding properties unique in the lumber field. It averages less than nine pounds per cubic foot, which is 40% of the weight of the lightest North American species. Balsa's cell structure affords a combination of high rigidity and compressive and tensile strength far superior to any composite, matted or snythetic material of equal or higher density. Because of its inconspicuous growth increments and lightness, balsa is dimensionally stable and it may be processed by standard woodworking techniques.

It is known that end-grain balsa is capable of supporting far greater loads than flat-grain material of the same density, and also that low-density material will in the end-grain direction support greater loads than flat-grain wood of higher density. This is illustrated in the following table based on tests performed on balsa of "Belcobalsa" quality, manufactured by the Balsa-Ecuador Lumber Corporation, the tests having been carried out by Forest Products Laboratory of the U.S. Department of Agriculture, the test results appearing in Reports 1511 and 1528 of this laboratory.

MECHANICAL PROPERTIES OF BELCOBALSA

[Data for pieces averaging 12% moisture content]

| Weight in pounds per cubic foot | 6 | 11 | 15½ |
|---|---|---|---|
| Specific Gravity | .0962 | .176 | .248 |
| Compressive Strength (pounds per square inch): | | | |
| (A) Parallel to grain (end grain)— | | | |
| Stress at proportional limit | 500 | 1,450 | 2,310 |
| Maximum crushing strength | 750 | 1,910 | 2,950 |
| Modulus of elasticity | 330,000 | 768,000 | 1,164,000 |
| (B) Perpendicular to grain (flat grain)— | | | |
| Stress at proportional limit: | | | |
| High strength value | 84 | 144 | 198 |
| Low strength value | 50 | 100 | 145 |
| Modulus of Elasticity: | | | |
| High strength value | 16,000 | 37,000 | 55,000 |
| Low strength value | 5,100 | 13,000 | 19,900 |
| Tensile Strength (pounds per square inch): | | | |
| (A) Parallel to grain (end grain)— | | | |
| Maximum | 1,375 | 3,050 | 4,525 |
| (B) Perpendicular to grain (flat grain)— | | | |
| Maximum-high strength value | 112 | 170 | 223 |
| Low strength value | 72 | 118 | 156 |
| Hardness (pounds), load required to embed a .444″ ball to ½ its diameter: | | | |
| (A) Parallel to grain (end grain) | 102 | 250 | 386 |
| (B) Perpendicular to grain (flat grain)— | | | |
| High strength value | 50 | 120 | 186 |
| Low strength value | 47 | 103 | 151 |

Referring now to FIG. 1, the composite truss-and-laminate structure in accordance with the invention is constituted by facing sheets 10 and 11 which may be formed of metal, wood, fabric, or other suitable rigid, semi-rigid or flexible sheeting material, between which is interposed a core of end-grain balsa, generally designated by numeral 12.

Core 12 is composed of interfitting triangular sections 12A, 12B, 12C, etc., which are joined together to form a slab whose upper surface is bonded to the top facing sheet 10 by an adhesive layer 13, and whose lower surface is bonded to the bottom facing sheet 11 by an adhesive layer 14. The adhesive layers may be of any material appropriate to the nature of the facing sheets, such as epoxies, vinyl phenolics and polyurethane elastomers. The grain direction of all of the triangular sections is perpendicular to the plane of the facings to obtain the mechanical benefits of the orthotropic material.

The interfacial boundaries of the interfitting triangular sections are joined together by a layer of adhesive which may be reinforced by a matting material such as fiber glass, the boundary between sections 12A and 12B being joined by a layer 12a–b, the boundary between sections 12B and 12C by a layer 12b–c, etc. In practice other forms of reinforcing material may be used, such as metal foil. These angularly disposed layers constitute the bracing web members of a truss whose horizontal chords are formed by the facing sheets 10 and 11.

A truss, as is well known, is a framed structure composed of a series of adjoining triangles formed by straight members. The top line of members of a truss is called the top chord, and the lower line, the bottom chord, whereas the members connecting the top and bottom chords are known as web members.

Since rigidity of the truss is secured by triangles which cannot deform without changing the length of the sides, it is generally assumed that loads applied thereto will produce direct stress only. In the present composite structure, weaknesses inherent in the truss structure are counterbalanced by the end-grain laminate structure, whereas weaknesses inherent in the latter are overcome by the former, to produce a coordinated combination of structural features giving rise to exceptional mechanical properties.

It is to be understood that the interfitting sections of the core material need not be limited in cross-sectional form to triangular shapes and that truss structures may be constituted by trapezoidal or truncated triangular forms as well as purely triangular shapes, this class of shapes being generically identified herein as "trianguloid."

In one practical embodiment of the invention, the facings are each formed by two layers of fiber glass cloth (10 oz. per square yard—United Merchants 114), whereas the matting forming the reinforced web is made of fiber glass (10 mil thickness). The lamination of the facing sheets and of the matting to the balsa is effected by polyester resin (Selection 1534). The triangular sections of the core are so cut whereby the webbing lies at an angle of 45° to the facing chords, thereby forming a simple truss. Tests on these composite structures indicate a substantial increase in their load-bearing ability as compared to laminates of the same dimensions and materials but lacking the internal truss feature. The reinforcing truss imparts longitudinal stiffness and increases the shear strength of the core, particularly in the vertical direction, without, however, adding materially to its weight. It will also be appreciated that the invention does not substantially add to the cost of the laminate.

It is to be understood that the composite structure is not limited to triangular arrangements of the type disclosed herein, and that other angles increasing or decreasing the number of web members interconnecting the upper and lower chords, may be used, depending on the ultimate strength and characteristics required and the anticipated load. Also trapezoidal arrangements may be used. The composite structure is useable in many situations in which the conventional laminates are inadequate, as in high-pressure containers and hulls, truck boxes, railroad cars, aircraft parts and boats, and in other places where exceptionally heavy loads are imposed on the structure.

While the invention has been disclosed in connection with end-grain balsa as the core material, it is to be understood that other orthotropic material may be used in the same manner, particularly where weight considerations are not a primary factor. On the other hand, regardless of what combination of material is used, weight can be important. For instance, replacement of a steel truss or girder with a composite sandwich of sheet steel bonded to end grain spruce will afford a substantial saving in weight, although the basic product is still relatively heavy.

In the embodiment shown in FIG. 1, the webs of the truss are formed by reinforced adhesive layers. In some situations it may be desirable to further reinforce the webs and thereby further strengthen the vertical shear characteristics of the laminate. This may be accomplished, as shown in FIG. 3, by specially forming the webs 15a–b, 15b–c, etc., in a composite structure constituted by triangular core sections 15A, 15B, 15C, etc. laminated to facing sheets 16 and 17.

Each web member itself is a miniature or minor composite structure forming, as shown in web 15a–b, by facing sheets 18 and 19 having a core interposed therebetween, this core being constituted by two triangular end-grain sections 20 and 21 joined together by a web layer 22. It will be seen that the end grain of sections 20 and 21 is perpendicular to facings 18 and 19 which in turn lie at an angle to the facings 16 and 17 of the main structure. Thus the grain of the balsa in the composite web 15a–b is angularly displaced relative to the grain direction of the balsa in the main structure.

The composite structure lends itself to curved or otherwise shaped configurations in that the core being composed of triangular sections, need not be bent, so that it can be made to assume the desired configuration by adjustment of the sectional angles. This is shown in FIG. 4, the core being composed of triangular sections 23A, 23B, 23C, etc., interposed between facing sheets 24 and 25. The triangular sections are bonded together by web layers 23a–b, 23b–c, etc. as in the manner disclosed above. The facing sheets 24 and 25 are curved, this being accomplished by bending, draping or molding techniques, depending on the nature of the facing material. The triangular sections are cut so that the core conforms to curvature of the facing sheets. In practice, the adhesive used for the facings and the core sections is preferably such that after the structure is suitably curved, the adhesive is thereafter cured to fix and maintain the desired shape.

While there have been shown preferred embodiments of trussed sandwich laminates in accordance with the invention, it will be appreciated that many changes and modifications may be made therein without, however, departing from the essential spirit of the invention as defined in the annexed claims.

What is claimed is:

1. A composite truss and laminate structure comprising a core composed of interfitting sections having a trianguloid cross-sectional form, facing sheets of high tensile strength laminated to the upper and lower surfaces of said core to form a sandwich, said sections being bonded together by adhesive layers constituting the web members of a truss whose upper and lower chords are formed by said facing sheets, said core being formed of relatively lightweight orthotropic material whose grain runs perpendicularly to the plane of said facings.

2. A structure, as set forth in claim 1, wherein said sections are triangular in form.

3. A structure as set forth in claim 1, wherein said sections are trapezoidal in form.

4. A composite truss and laminate structure comprising an end-grain core composed of interfitting sections of balsa wood, having a trianguloid cross-sectional form, facing sheets of relatively high tensile strength laminated to the upper and lower surfaces of said core to form a sandwich of high strength-to-weight ratio, and adhesive layers bonding said sections together to form web members interconnecting the facing sheets which constitute the horizontal chords of a truss, the grain of said wood being perpendicular to the plane of said facings.

5. A composite structure, as set forth in claim 4, wherein said facing sheets are formed of fiber glass.

6. A composite structure as set forth in claim 4, wherein said webs are reinforced by fiber glass matting.

7. A composite structure, as set forth in claim 4, wherein said facing sheets are formed of metal.

8. A composite structure as set forth in claim 4, wherein said facing sheets are curved and said triangular sections form a core conforming to the curvature of said facing sheets.

9. A composite structure as set forth in claim 4, wherein the web members are each formed by a composite structure constituted by triangular end-grain sections bonded together to define an end-grain core sandwiched between facing sheets, whereby the web itself is a minor composite structure incorporated within a major composite structure.

10. A structure as set forth in claim 4, wherein said web members are reinforced with metal foil.

References Cited by the Examiner
UNITED STATES PATENTS 2,951,781   9/1960   Toegel _____ 144—309

FOREIGN PATENTS 717,552   2/1942   Germany.
684,092   12/1952   Great Britain.

EARL M. BERGERT, *Primary Examiner.*

DOUGLAS J. DRUMMOND, *Examiner.*